US010619940B2

(12) United States Patent
Hart

(10) Patent No.: US 10,619,940 B2
(45) Date of Patent: Apr. 14, 2020

(54) HEAT EXCHANGER SYSTEMS AND METHODS

(71) Applicant: The Boeing Company, Chicago, IL (US)

(72) Inventor: Gregory A. Hart, Torrance, CA (US)

(73) Assignee: The Boeing Company, Chicago, IL (US)

(*) Notice: Subject to any disclaimer, the term of this patent is extended or adjusted under 35 U.S.C. 154(b) by 379 days.

(21) Appl. No.: 14/811,596

(22) Filed: Jul. 28, 2015

(65) Prior Publication Data

US 2017/0030655 A1 Feb. 2, 2017

(51) Int. Cl.
*F28D 15/02* (2006.01)
*F28D 15/04* (2006.01)
*B23P 15/26* (2006.01)
*B23P 19/00* (2006.01)
*F28D 21/00* (2006.01)

(52) U.S. Cl.
CPC .......... *F28D 15/0275* (2013.01); *B23P 15/26* (2013.01); *B23P 19/00* (2013.01); *F28D 15/04* (2013.01); *F28D 2021/0021* (2013.01)

(58) Field of Classification Search
CPC ..................... F28D 15/0275; H01L 2023/4087
See application file for complete search history.

(56) References Cited

U.S. PATENT DOCUMENTS

| 2,024,111 | A | * | 12/1935 | Phillis | ....................... B25B 1/20 269/246 |
| 5,587,880 | A | * | 12/1996 | Phillips | ............... F28D 15/0266 165/104.29 |
| 5,735,489 | A | * | 4/1998 | Drolen | ..................... B64G 1/50 244/171.8 |
| 5,806,803 | A | * | 9/1998 | Watts | ..................... B64G 1/503 165/41 |
| 6,394,175 | B1 | * | 5/2002 | Chen | ..................... H01L 23/427 165/104.33 |
| 6,830,098 | B1 | * | 12/2004 | Todd | ................... F28D 15/0275 165/104.21 |
| 6,938,682 | B2 | * | 9/2005 | Chen | ..................... H01L 23/427 165/104.21 |

(Continued)

FOREIGN PATENT DOCUMENTS

| CN | 204262815 | U | * | 4/2015 | |
| JP | 05060476 | A | * | 3/1993 | ......... F28D 15/0275 |
| WO | WO 00/79208 | A1 | | 12/2000 | |

*Primary Examiner* — Frantz F Jules
*Assistant Examiner* — Lionel Nouketcha
(74) *Attorney, Agent, or Firm* — Haynes and Boone, LLP

(57) ABSTRACT

An apparatus and method according to one or more embodiments are provided to transfer heat away from various types of thermal sources in flight and/or non-flight systems. Heat transfer may be implemented as a heat exchanger plate that effectively transports heat from a physically secured thermal source to a thermal sink and further to a radiator. In one example, a heat exchanger plate includes a channel extending longitudinally along a surface of the heat exchanger plate and a heat pipe coupled substantially within the channel. A bottom surface and a lateral surface of the heat pipe are thermally bonded to a bottom surface and a lateral surface of the channel, respectively. Additional apparatus and methods are provided.

20 Claims, 9 Drawing Sheets

(56) References Cited

U.S. PATENT DOCUMENTS

| | | | | |
|---|---|---|---|---|
| 6,972,365 B2* | 12/2005 | Garner | ............... | H05K 7/20681 |
| | | | | 174/16.3 |
| 6,994,153 B2* | 2/2006 | Nomura | ................. | B64G 1/506 |
| | | | | 165/104.21 |
| 7,116,552 B2* | 10/2006 | Wu | ......................... | G06F 1/203 |
| | | | | 174/15.2 |
| 7,192,064 B2* | 3/2007 | Hsu | .................... | F28D 15/0283 |
| | | | | 165/104.26 |
| 7,991,515 B2* | 8/2011 | Lyon | ...................... | G06F 1/206 |
| | | | | 700/300 |
| 8,220,151 B2* | 7/2012 | Yang | .................... | B23K 1/0008 |
| | | | | 29/890.032 |
| 8,329,057 B2* | 12/2012 | Fukushima | ............... | C09K 5/10 |
| | | | | 252/67 |
| 8,820,684 B2* | 9/2014 | McKinnon | ............... | B64G 1/50 |
| | | | | 244/171.8 |
| 2001/0050165 A1* | 12/2001 | Cheung | ................... | F28D 15/02 |
| | | | | 165/104.34 |
| 2003/0102108 A1* | 6/2003 | Sarraf | ................ | F28D 15/0266 |
| | | | | 165/80.3 |
| 2005/0098300 A1* | 5/2005 | Kawabata | ........... | F28D 15/0233 |
| | | | | 165/80.3 |
| 2007/0151711 A1* | 7/2007 | Chen | ...................... | H01L 23/427 |
| | | | | 165/104.33 |
| 2007/0279867 A1 | 12/2007 | Lin | | |
| 2015/0184948 A1* | 7/2015 | Lin | ........................ | F28D 15/02 |
| | | | | 165/104.21 |

* cited by examiner

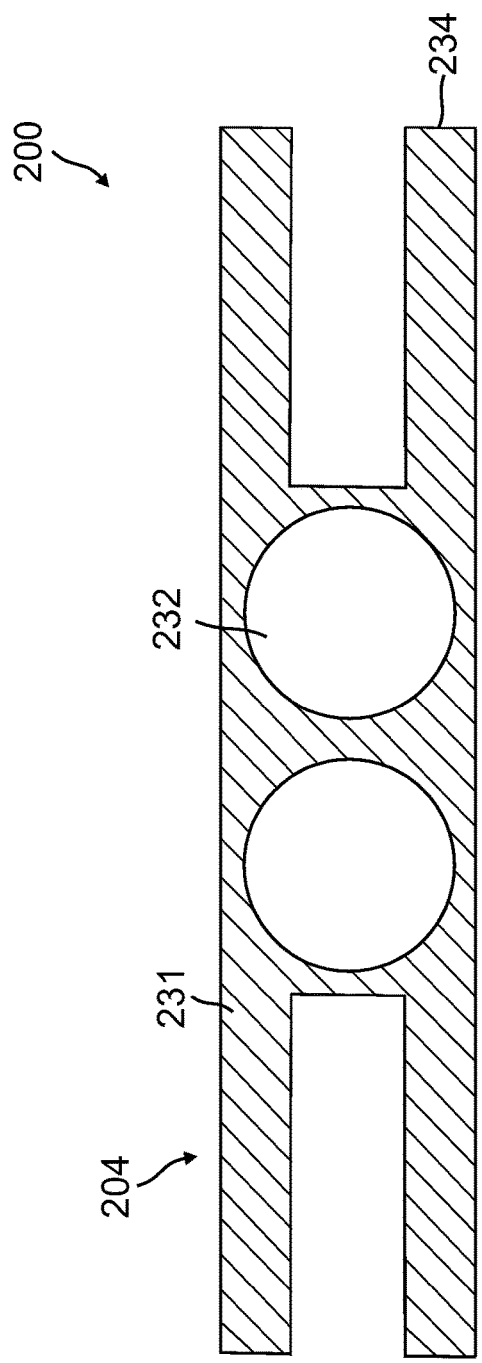
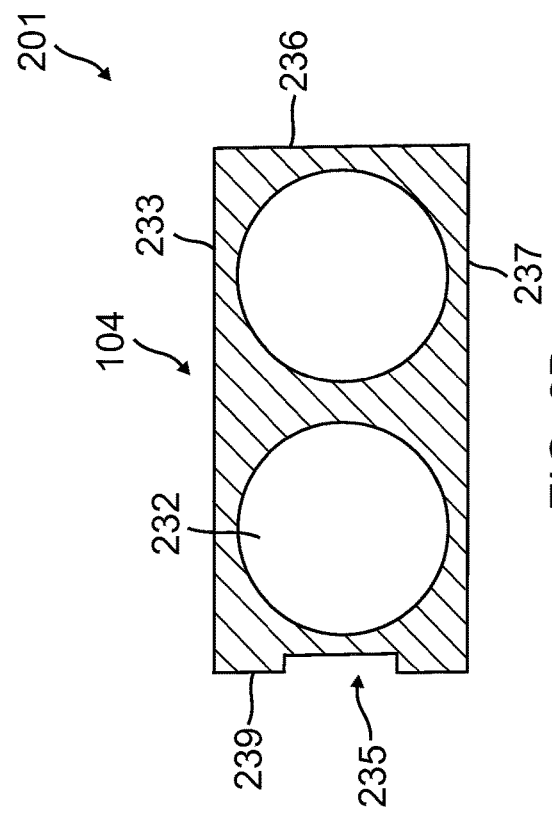
FIG. 2A
FIG. 2B

HEAT EXCHANGER SYSTEMS AND METHODS

GOVERNMENT LICENSE RIGHTS

This invention was made with Government support. The Government has certain rights in the invention.

TECHNICAL FIELD

One or more embodiments of the invention relate generally to thermal transfer and more particularly, for example, to improvements in transferring heat away from thermal sources using heat exchangers.

BACKGROUND

In the field of flight applications, there is an ongoing effort to improve the capacity and space/weight efficiency of thermal systems configured to transfer heat away from various types of thermal sources. During normal operation, electrical and electronic equipment typically generate enough heat (e.g., through resistive heating) that conventional mounting and electrical lead connections are insufficient to maintain operation within generally applicable thermal limits, particularly when the equipment is enclosed in a cowling or placed in a vacuum and fluid/gas immersion is unavailable. For example, heat transfer for space flight applications relies on the ability to transfer heat from one or more thermal sources to a relatively large radiator (e.g., a thermal sink), which can be used to radiate excess heat (e.g., as black body radiation) out into space.

Conventional thermal regulation systems employ a number of techniques to convey heat from thermal sources to thermal sinks strategically placed throughout a vehicle. However, these conventional systems are typically relatively heavy and require space in which to form thermal links to the thermal sinks.

Moreover, because space and weight are a premium in flight applications, retrofitting thermal regulation systems (e.g., to account for increased thermal load due to feature creep/innovation during the design and manufacture process) can be extremely complex and costly. Thus, there is a need for an improved methodology to provide relatively efficient thermal regulation/transfer systems both in terms of overall capacity or thermal transfer throughput and overall space and weight used to implement the system.

SUMMARY

Systems and methods are disclosed herein providing an improved approach to heat exchanger systems. In some embodiments, a heat exchanger system may be implemented with a conductive metal heat exchanger plate and heat pipes coupled to and/or within the heat exchanger plate. The heat pipes may be formed from extruded conductive metal, such as extruded aluminum. In one example, two channels are formed extending longitudinally and substantially parallel along a surface of the heat exchanger plate. Further, each heat pipe is coupled substantially within a channel, thermally bonded to two sides of the channel, and then physically secured to the heat exchanger plate. In various embodiments, one or more recesses may be formed adjacent and/or orthogonal to each of the two channels. A thermal interface material may be positioned within the recess, and a thermal sink may be secured to the heat exchanger plate at the recess to provide compression contact with the thermal interface and thermal coupling to the heat exchanger plate. One or more thermal sources may be coupled to the heat exchanger plate, using a similar technique for example, and heat generated by the thermal sources may be conveyed through the plate and/or heat pipes through the thermal interface to the thermal sink. The thermal sink may be further physically secured to a radiator to express heat into the environment.

In various embodiments, the heat exchanger plate may be secured to mechanical supports which are further secured to a flight system panel. The mechanical supports elevate the heat exchanger plate from the surface of the flight system panel to provide space to connect the thermal sinks to the surface of the heat exchanger plate without reducing the area of an opposing surface to which the thermal sources are coupled. Thus, the heat exchanger system efficiently transfers heat away from one or more thermal sources to one or more thermal sinks, which may then transfer heat to one or more radiators to radiate the heat into the environment (e.g., a surrounding gas, fluid, vacuum, and/or other environment).

In one embodiment, an apparatus includes a heat exchanger plate comprising a channel extending longitudinally along a surface of the heat exchanger plate; and a heat pipe coupled substantially within the channel; wherein a bottom surface and a lateral surface of the heat pipe are thermally bonded to a bottom surface and a lateral surface of the channel, respectively.

In another embodiment, a method includes providing a heat exchanger plate comprising a channel extending longitudinally along a surface of the heat exchanger plate; providing a heat pipe configured to couple substantially within the channel; and thermally bonding a bottom surface and a lateral surface of the heat pipe to a bottom surface and a lateral surface of the channel, respectively.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 2A and 2B illustrate cross-sections of a heat pipe in accordance with embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Typically, flight system panels are designed with embedded thermal conduits routed in proximity to thermal sources (e.g., heat generating electrical and electronic units) to transfer generated heat away from the thermal source. During the design process or the manufacture of the flight system panel, additional features may be added, or there may be a need to modify and/or add heat generating thermal sources to enable a particular application. Unfortunately, there may not be sufficient mounting surface area available on the flight system panel, or existing thermal conduits may not be in proximity to a desired mounting location. Therefore, a custom heat exchanger system may be required to mount the thermal source and provide for efficient heat transfer.

Conventional solutions may include a thermally conductive mounting plate, but conventional solutions lack sufficient heat transfer capacity/efficiency, particularly with respect to typical dissipation in contemporary electronics. Further, conventional mounting plates may be heavy and/or too large to mount within a limited re-design space. Embodiments of the present heat exchanger system provide an efficient thermal transfer system both in terms of overall capacity/thermal transfer throughput and in terms of overall space and weight used to reach such capacities. It will be appreciated that embodiments of the disclosure may be implemented in non-flight applications (in addition to flight applications) where space and/or weight are a premium, for example.

Figure 1:
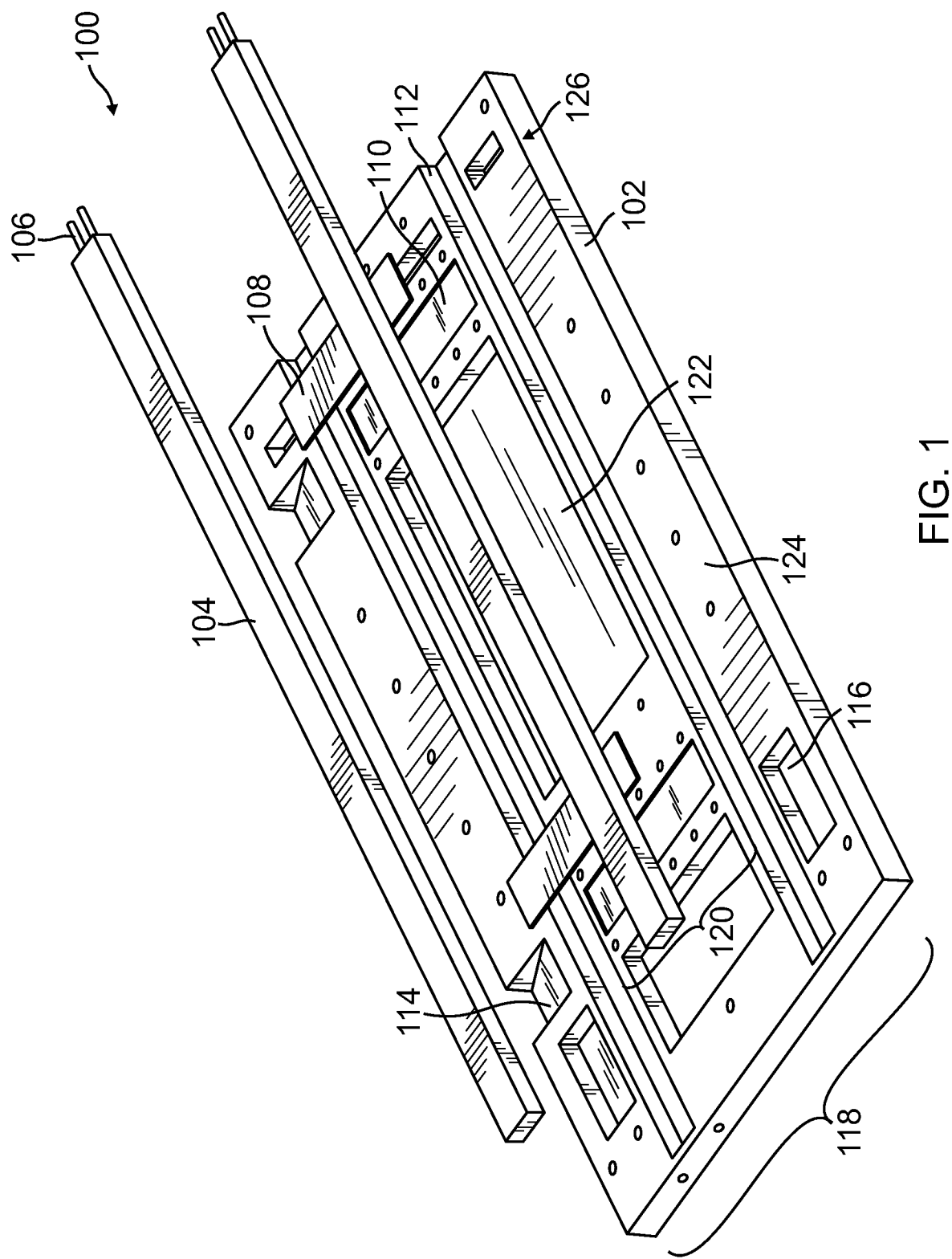
FIG. 1 illustrates a heat exchanger plate in accordance with an embodiment of the disclosure.

FIG. 1 illustrates a heat exchanger system 100 in accordance with an embodiment of the disclosure. Heat exchanger system 100 includes a heat exchanger plate 102. In some embodiments, heat exchanger plate 102 may be aluminum, for example, and may be formed to receive and precisely position various additional elements of heat exchanger plate 102, such as a channel 112 formed to receive a heat pipe 104. In this regard, channel 112 may be formed extending longitudinally along a plate surface 124 of heat exchanger plate 102. A second channel 112 may extend longitudinally along plate surface 124 of heat exchanger plate 102, wherein second channel 112 may be substantially parallel to and spaced from first channel 112 and formed to receive a second heat pipe 104. In some embodiments, channels 112 and heat pipes 104 may be curvilinearly shaped, for example, or otherwise shaped differently than shown in FIG. 1.

As shown in the embodiment presented by FIG. 1, heat exchanger plate 102 may include a recess 110 formed adjacent to channel 112 in plate surface 124. Recess 110 may be configured to receive a thermal interface material 108, such as thermal grease, thermal tape, different types of grafoil, and/or other thermal interface materials. Thermal interface material 108 may be configured to thermally couple heat exchanger plate 102 to a thermal sink (e.g., such as thermal sink 671 of FIG. 6). Recess 110 may be implemented with a depth configured to select a compression force for thermal interface material 108 while heat exchanger plate 102 is coupled to thermal sink 671. For example, a shallower depth may result in a higher compression force when a thermal sink 671 is coupled to heat exchanger plate 102 at recess 110. Too high or too low a compression force may reduce the thermal conductivity of thermal interface material 108, depending on the type of material used.

In various embodiments, thermal interface material 108 may be pressed or tack bonded in place within recess 110. In some embodiments, two or more recesses 110 may be formed in heat exchanger plate 102, each disposed adjacent to channels 112 at opposite ends of heat exchanger plate 102 to allow heat to flow from heat pipes within the channels through thermal interface material 108 to coupled heat sinks, as described herein.

Additionally, one or more flight shim access pockets 116 may be formed in plate surface 124 to facilitate insertion and extraction of flight shims (e.g., flight shims 349 of FIG. 3) and/or to help reduce the mass or weight of heat exchanger plate 102. Flight shim access pockets 116 may be formed in plate surface 124 at a plurality of locations where shaped flanges 344 (see FIG. 3) of heat pipe 104 may be secured to heat exchanger plate 102.

As shown in FIG. 1, an inclined slot 114 may be disposed or formed in a side of plate surface 124. Inclined slot 114 may be configured to allow clearance for an elongate thermal sink (e.g., elongate thermal sink 671 shown in FIG. 6), coupled to plate surface 124 at recess 110, to curve away from and extend perpendicularly through plate surface 124. In some embodiments, two or more inclined slots 114 may be formed, each disposed in a side of heat exchanger plate 102 distributed across various ends of plate surface 124, as shown.

Figure 6:
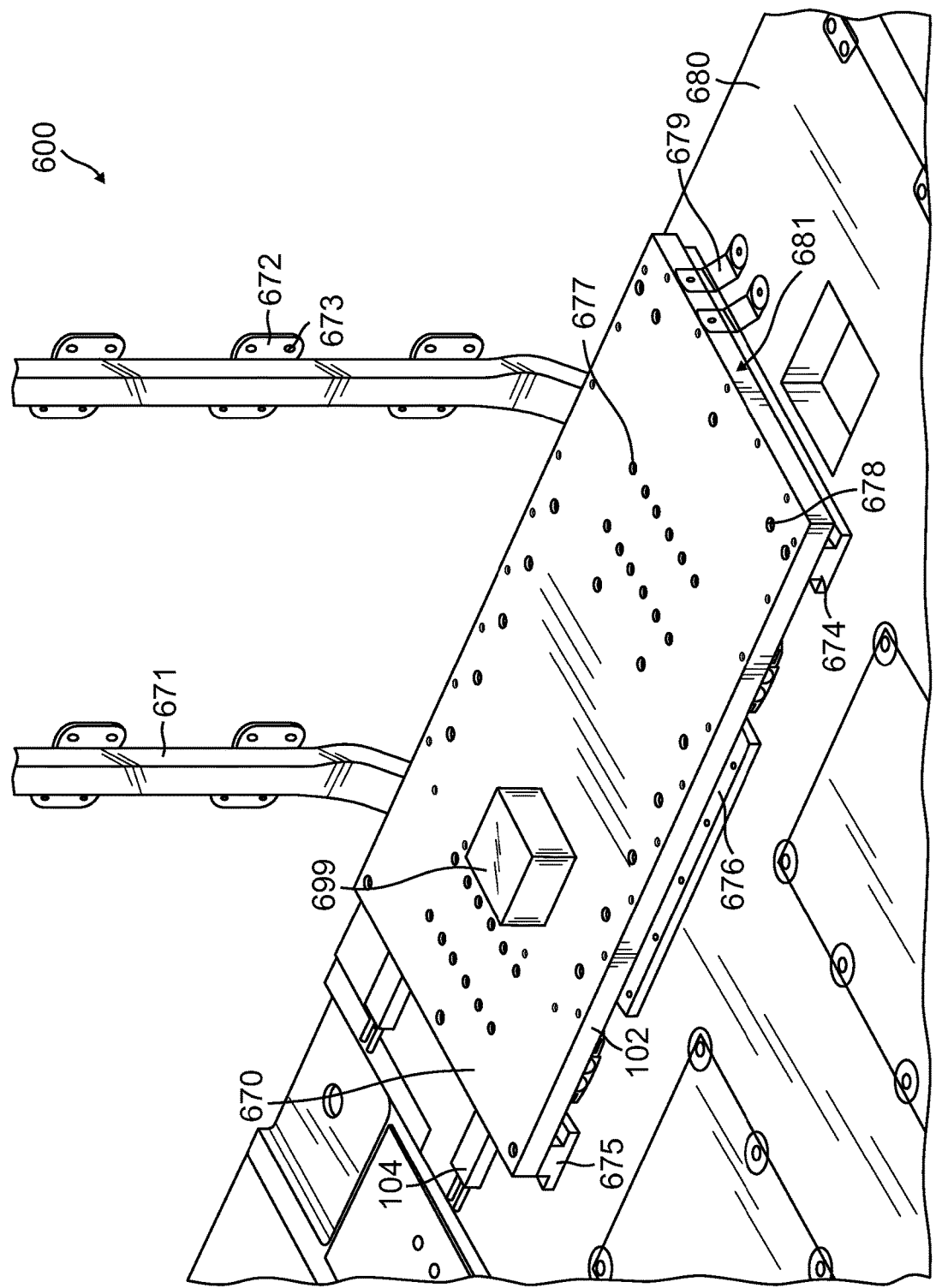
FIG. 6 illustrates an assembly including a heat exchanger plate physically secured to system panel in accordance with an embodiment of the disclosure.
Figure 7:
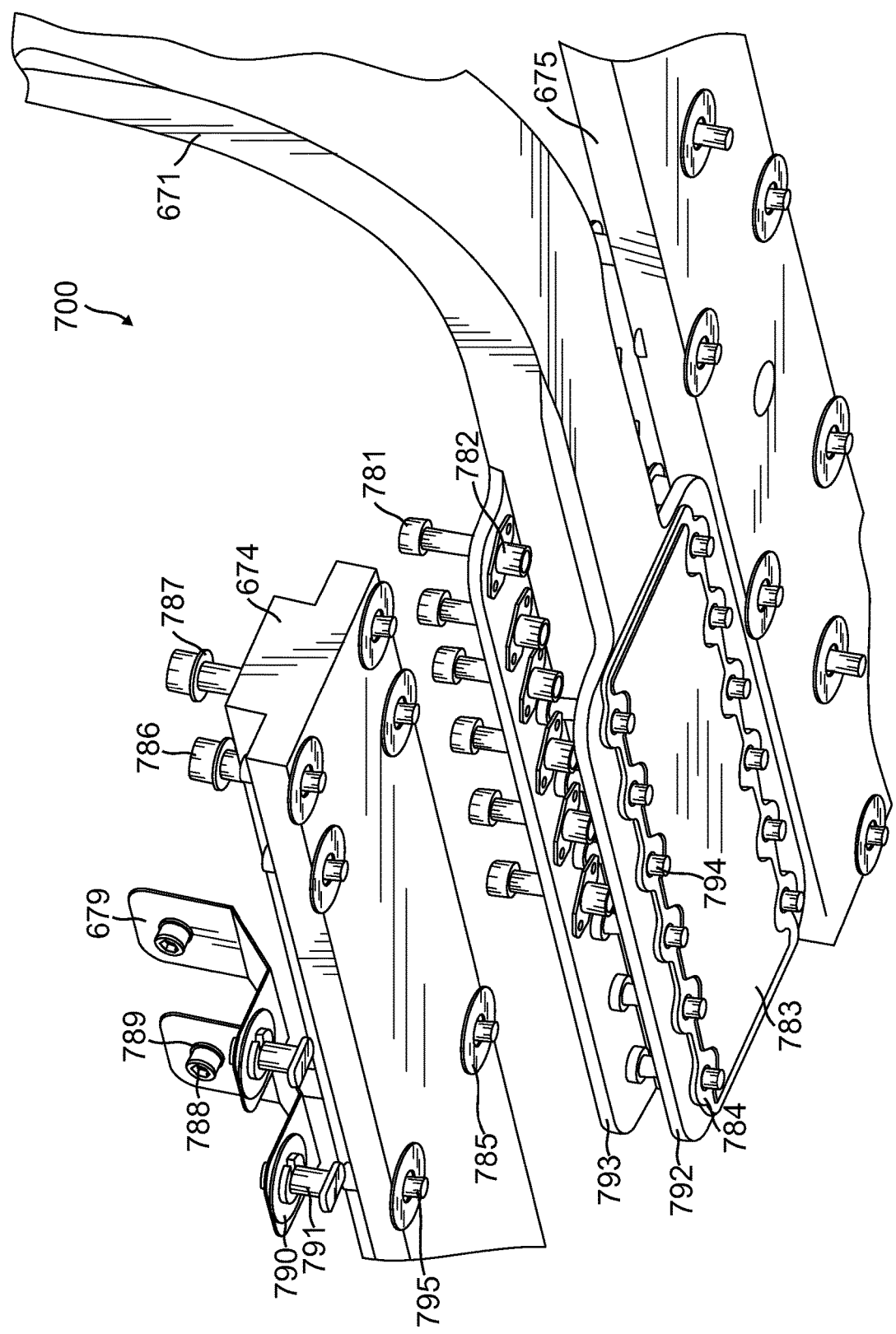
FIG. 7 illustrates an assembly including connection joints between a thermal sink, mechanical supports, and a system panel in accordance with an embodiment of the disclosure.

Further, a plurality of hole patterns (e.g., mechanical support hole pattern 118 and thermal sink mounting hole pattern 120) may be formed through heat exchanger plate 102 to receive washers and fasteners (e.g., washers 787 and fasteners 786 and 781 of FIG. 7). Such washers and fasteners may be used to physically secure heat exchanger plate 102 to various mechanical supports (see mechanical supports 674, 675 and 676 of FIG. 6), for example, and/or to physically secure thermal sinks to heat exchanger plate 102 (e.g., thermal sink 671 of FIG. 6 and/or fasteners 781 of FIG. 7).

Finally, heat exchanger plate 102 may include one or more blind pockets 122 formed in plate surface 124 that may be configured to reduce a weight of heat exchanger plate 102.

Heat pipe 104 may include a plurality of pipe cavities (e.g., pipe cavities 232 of FIGS. 2A and 2B) disposed longitudinally within heat pipe 104. Each pipe cavity may be sealed flush at a first end of heat pipe 104. A fill tube 106 may be connected (e.g., soldered) to a second end of heat pipe 104.

Heat pipe 104 may be coupled substantially within channel 112. In particular, heat pipe 104 may be thermally bonded to heat exchanger plate 102 on two sides of heat pipe 104 to increase a thermal transfer capacity (e.g., associated with thermally bonded surface area) between heat pipe 104 and heat exchanger plate 102. In this regard, a bottom surface (e.g., finished bottom surface 237 of FIG. 2B) and a lateral surface (e.g., finished lateral surface 236 of FIG. 2B) of heat pipe 104 may be thermally bonded to a bottom surface (e.g., bottom channel surface 454 of FIG. 4) and a lateral surface (e.g., inner channel surface 455 of FIG. 4) of channel 112, respectively. Bonding along two surfaces of heat pipe 104 provides an approximate 50% improvement in heat transfer capacity/efficiency between heat exchanger plate 102 and heat pipe 104 compared to embodiments with only the bottom surfaces thermally bonded. In this regard, heat is more evenly distributed throughout heat exchanger plate 102 and/or more efficiently transported from thermal sources coupled to heat exchanger plate 102 to thermal sinks coupled to heat exchanger plate through thermal interface material 108. This increase in heat transfer capacity/efficiency is a significant improvement in heat exchanger plate thermal transfer performance and meets heat transfer needs of modern custom heat exchanger systems.

FIG. 2A illustrates a cross-section of extruded heat pipe stock 200 in accordance with an embodiment of the disclosure. FIG. 2B illustrates a cross-section of a finished heat pipe 201 in accordance with an embodiment of the disclosure. Extruded heat pipe stock 204 may be extruded from an aluminum bar. However, other materials may be used and extruded, machined, or otherwise used to form heat pipe stock 204. Heat pipe 104 may be sectioned from extruded heat pipe stock 204 to a length that, in some embodiments, approximates the length of heat exchanger plate 102. In other embodiments, the length of heat pipe 104 may be longer or shorter than the length of heat exchanger plate 102. In various embodiments, heat pipe 104 may be implemented as a multi cavity heat pipe.

As shown in the embodiment illustrated in FIG. 2A, extruded heat pipe stock 204 includes a body 231, two separate pipe cavities 232 and flanges 234. A lateral surface 235 and a finished lateral surface 236 of heat pipe 104 may be machined to remove excess material of flange 234 to form a plurality of shaped flanges (e.g., shaped flanges 344 of FIG. 3). After machining, a plurality of nubs 239 may remain on lateral surface 235 and finished lateral surface 236. Precise machining of lateral surface 235 may not be required to remove nubs 239, as lateral surface 235 may not need to be finished for thermal bonding. However, finished lateral surface 236 and finished bottom surface 237 may require a machined finish acceptable for thermally bonding to channel 112. In this regard, surfaces 236 and 237 may require removal of nubs 239 and further machining/polishing to be finished (e.g., substantially flat in two dimensions and free of defects, nodules, nubs, and/or other defects). Thus, precise machining, lapping, polishing, and/or other types of forming of finished lateral surface 236 and finished bottom surface 237 is typically required. In various embodiments, finished lateral surface 236 and finished bottom surface 237 may be substantially planar and orthogonal to each other in order to match similarly oriented surfaces of channel 112. Finishing surfaces (e.g., finished lateral surface 236 and finished bottom surface 237) of heat pipe 104 that may be bonded provides for optimum surface area contact when thermally bonding to adjacent surfaces of channel 112. In some embodiments, top surface 233 does not require machining beyond any required to form heat pipe stock 204. In certain other embodiments, top surface 233 and bottom surface 237 may both be finished, as described herein, to facilitate thermal balance along heat pipe 104.

As shown, heat pipe 104 may be implemented with a plurality of separate pipe cavities 232 disposed longitudinally along heat pipe 104. In some embodiments, heat pipe 104 includes two adjacent pipe cavities 232. Each pipe cavity 232 may be sealed flush at a first end of heat pipe 104 and may be coupled to a heat pipe fill tube 106 (see FIG. 1) at a second end of heat pipe 104. Each pipe cavity 232 may be configured to sealably contain a convection gas and/or fluid over an approximate temperature range from −40 to 130 degrees Celsius and an external pressure substantially at vacuum. In some embodiments, each pipe cavity may be configured to sealably contain the convection gas/fluid over larger and/or different temperature ranges, such as any temperature range within approximately 60K to 430K.

Figure 3:
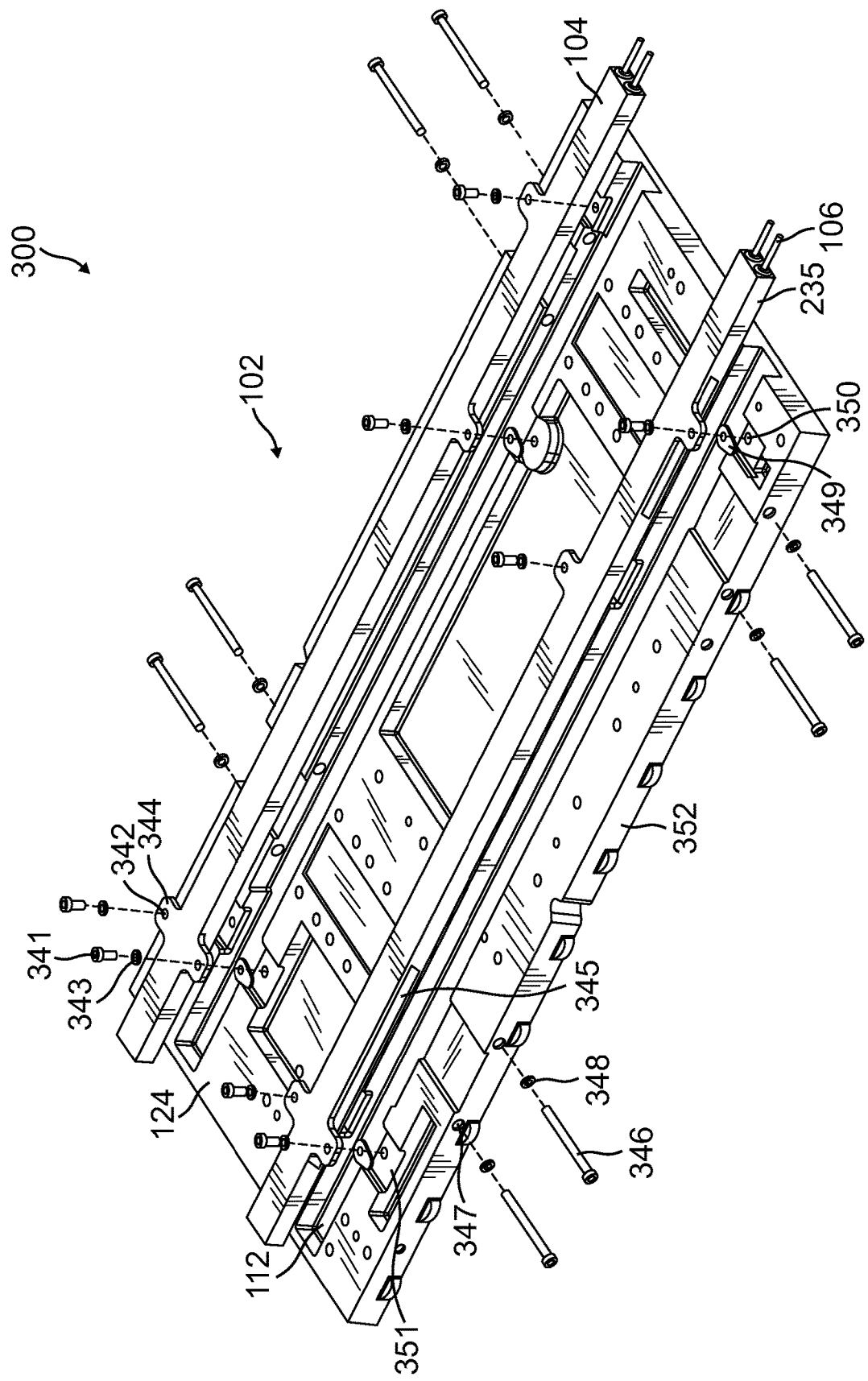
FIG. 3 illustrates an exploded view of a heat exchanger plate in accordance with an embodiment of the disclosure.

FIG. 3 illustrates an exploded view of a heat exchanger plate 300 in accordance with an embodiment of the disclosure. In some embodiments, heat exchanger plate 102 includes two channels 112 and two heat pipes 104, each coupled substantially within their respective channels 112, which may extend longitudinally along plate surface 124 of heat exchanger plate 102 substantially parallel to and spaced from each other. Channels 112 may be formed in heat exchanger plate 102 extending from near a first longitudinal end of heat exchanger plate 102 and breaking through a second longitudinal end of heat exchanger plate 102, as shown. As such, channels 112 may be referred to as partially open channels in heat exchanger plate 102.

In various embodiments, each heat pipe 104 includes one or more shaped flanges 344 used to physically secure heat pipe 104 to heat exchanger plate 102 after heat pipe 104 has been thermally bonded to heat exchanger plate 102.

As shown, each heat pipe 104 includes fill tubes 106 that may be soldered or otherwise joined an end of heat pipe 104 and used to fill pipe cavities 232 with a convection gas and/or fluid as described herein. Fill tubes 106 may be pinched off, soldered, and/or otherwise sealed to form a leak-proof seal after pipe cavities 232 are filled.

In some embodiments, heat exchanger plate 102 includes one or more flight shims 349. Each flight shim 349 may be disposed within a corresponding flight shim recess 351 and be implemented with a thickness configured to select a compression force securing heat pipe 104 against a bottom surface of channel 112 when shaped flanges 344 are secured to heat exchanger plate 102. In this regard, one or more flight shim recesses 351 may be formed adjacent to channel 112 substantially beneath shaped flanges 344 and may be configured to receive flight shims 349. In various embodiments, flight shims 349 may be configured to provide an electrostatic discharge (ESD) ground path to prevent electro static charge on heat pipe 104.

In some embodiments, after the heat pipes 104 are thermally bonded to heat exchanger plate 102, each heat pipe 104 may be physically secured flush to plate surface 124 (e.g., see FIG. 1) of heat exchanger plate 102 at shaped flanges 344. A plurality of threaded holes 350 may be formed in heat exchanger plate 102 corresponding to a plurality of shaped flange through holes 342. Each of threaded holes 350 may be configured to receive a washer 343 and a flight fastener 341 to physically secure heat pipe 104 to heat exchanger plate 102.

In various embodiments, a plurality of threaded holes 347 may be formed within a lateral outer surface 352 of heat exchanger plate 102 and may extend to an opposing lateral surface of channel 112, as shown. At least one lateral shim 345 may be disposed between an opposing lateral surface 235 of heat pipe 104 and one or more threaded holes 347. Each threaded hole 347 may be configured to accept a washer 348 and a compression screw 346. Threaded holes 347 may be configured to allow compression screws 346 to provide a lateral compression force through lateral shim 345 to heat pipe 104 to help thermally bond lateral surface of heat pipe 104 to lateral surface of channel 112, as described herein.

Incorporating at least one heat pipe which may be thermally bonded to heat exchanger plate 102 on a bottom and lateral surface provides for an efficient heat transfer system while minimizing space and weight impacts. Further, two heat pipes provide for additional heat transfer capacity to accommodate increased thermal transfer requirements, and provide redundancy if one heat pipe fails (e.g., similarly with respect to cavities 232 of heat pipes 104). Thus, heat exchanger plate 102 described herein provides an efficient, adaptable, and reliable solution for modern heat transfer systems.

Figure 4:
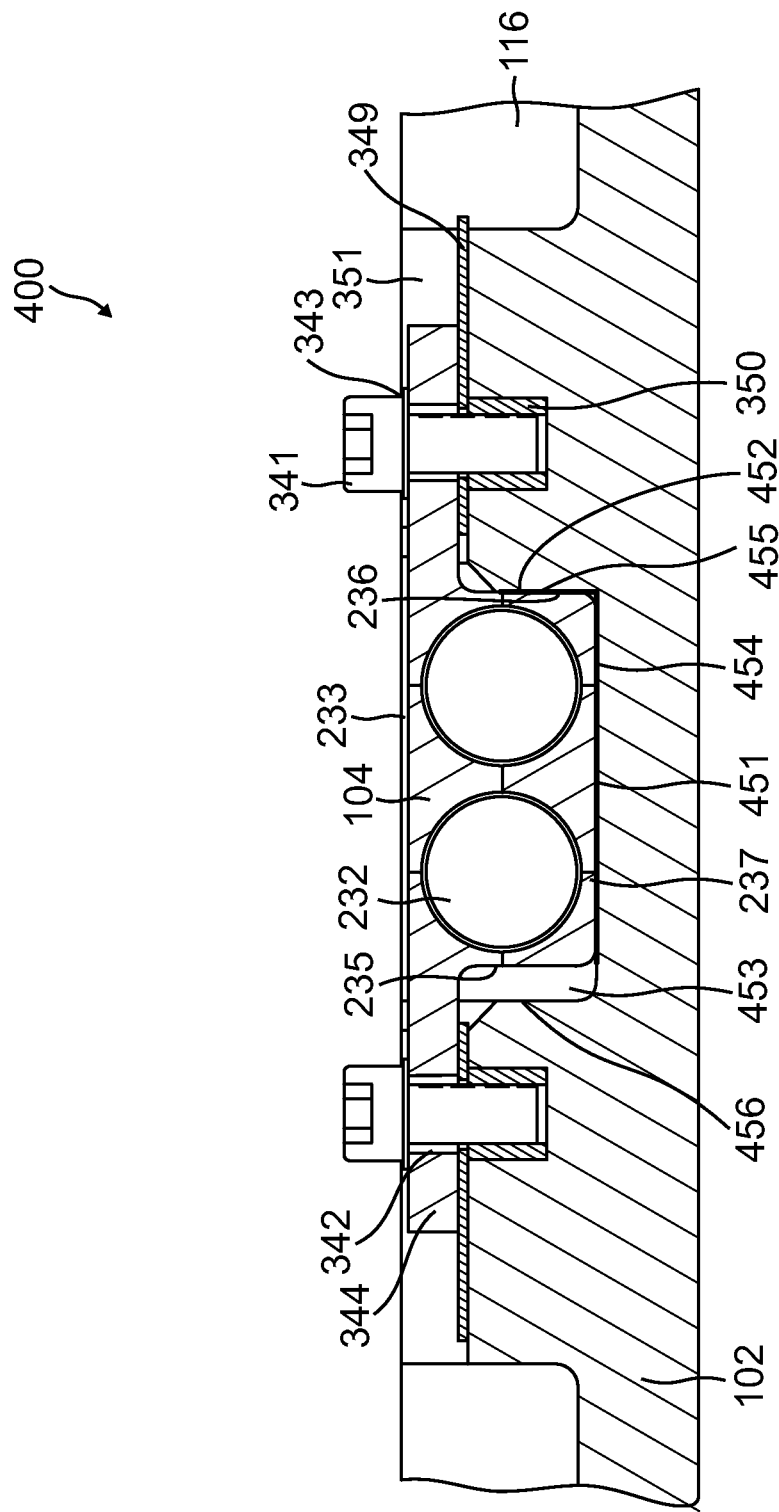
FIG. 4 illustrates a cross-section of a heat pipe physically secured to a heat exchanger plate in accordance with an embodiment of the disclosure.

FIG. 4 illustrates a cross-section 400 of a heat pipe physically secured and thermally bonded to heat exchanger plate 102 in accordance with an embodiment of the disclosure. FIG. 4 shows heat pipe 104 thermally bonded to channel 112. In this regard, two surfaces of heat pipe 104 may be bonded to adjacent surfaces of channel 112. A bottom surface (e.g., finished bottom surface 237) and a lateral surface (e.g., finished lateral surface 236) of first heat pipe 104 may be thermally bonded to a bottom surface (e.g., bottom channel surface 454) and a lateral surface (e.g., inner channel surface 455) of first channel 112, respectively.

Lateral thermal bond 452 provides for an efficient heat transfer interface between channel 112 inner channel surface 455 and heat pipe 104 finished lateral surface 236. Bottom thermal bond 451 provides for an efficient heat transfer interface between channel 112 bottom channel surface 454 and heat pipe 104 finished bottom surface 237.

In preparation for thermal bonding, a material for bottom thermal bond 451 (e.g., a thin film material) may be placed or disposed between finished bottom surface 237 and corresponding bottom channel surface 454. A lateral thermal bond 452 material (e.g., also a thin film material) may be placed or disposed between finished lateral surface 236 and corresponding inner channel surface 455. Further, heat pipe 104 may be positionally placed within channel 112.

Regarding thermal bonding, a clamp or weight may be provided to apply vertical compression force between top surface 233 of heat pipe 104 and an opposing surface of heat exchanger plate 102 (e.g., top surface 670 shown in FIG. 6). The clamp or weight may be used to apply sufficient compression force to keep finished bottom surface 237 firmly pressed against bottom thermal bond 451 and channel surface 454. In some embodiments, clamping or weighting to apply a vertical compression force may ensure constant and/or uniform contact between finished bottom surface 237 and bottom channel surface 454 while the assembly is thermally cycled and/or bottom thermal bond 451 material cures. For example, during thermal cycling, thermal bond 451 may soften or liquefy and heat pipe 104 might move relative to channel surface 454, and the clamping or weighting may be configured to substantially retain the vertical compression force throughout the thermal cycling. Other forms of applying a vertical compression force while bottom thermal bond 451 material cures may be used.

Further regarding thermal bonding, one or more washers 348 and compression screws 346 (see FIG. 3) may be used when thermally bonding finished lateral surface 236 to a corresponding lateral surface (e.g., inner channel surface 455) of channel 112. In this regard, threaded holes 347 may extend from a lateral surface 352 of heat exchanger plate 102 to an opposing lateral surface of channel 112 to receive compression screws 346. At least one lateral shim 345 may be disposed between an opposing lateral surface 235 of heat pipe 104 and one or more threaded holes 347. Compression screws 346 are turned into threaded holes 347 to provide a lateral compression force through lateral shim 345 to heat pipe 104 to aid in thermally bonding finished lateral surface 236 to inner channel surface 455. In this regard, compression screws 346 may ensure constant and/or uniform contact between heat pipe 104 finished lateral surface 236 to inner channel surface 455 while the assembly is thermally cycled and/or lateral thermal bond 452 material cures.

Thermally cycling and/or curing bottom thermal bond 451 and lateral thermal bond 452 material may generally be performed using temperatures greater than 72 degrees for a period of time dependent on the temperature at which the material is cured (e.g., the temperature may be material-dependent). The temperature environment may be dynamic, where heat exchanger plate 102 including bottom thermal bond 451 and lateral thermal bond 452 materials may slew through a plurality of temperatures as heat exchanger plate 102 cycles between a lower and an upper target temperatures. In some embodiments, the temperature environment may be substantially static, wherein heat exchanger plate 102 including bottom thermal bond 451 and lateral thermal bond 452 materials may be held at a constant elevated temperature for a period of time while bottom thermal bond 451 and lateral thermal bond 452 materials cure.

After bottom thermal bond 451 and lateral thermal bond 452 materials have cured, bonding equipment such as clamps, compression shims 345, screws 346 and washers 348 may be removed. In this regard, utilizing heat exchanger plate 102 as an aid in thermal bonding heat pipes 104 to channels 112 reduces the need for excess handling and thereby reduces likelihood of damage to the thermally bonded surfaces.

Assembly of heat exchanger plate 102 may include installing a plurality of flight shims 349 to aid in securing heat pipes 104 or heat exchanger plate 102. Flight shims 349 may be positioned and/or placed between shaped flanges 344 of heat pipe 104 and heat exchanger plate 102 at each location of flight shim recess 351. Each flight shim recess 351 may be accessed through a flight shim access pocket 116. A plurality of flight fasteners 341 and washers 343 may be used to hold flight shims 349 in place. Flight fastener 341 may be installed with washer 343 and inserted into through hole 342 of shaped flange 344, through flight shim 349 and threaded into threaded hole 350. Flight fasteners 341 may be tightened to hold flight shims 349 in place and physically secure heat pipe 104 to heat exchanger plate 102. In this regard, flight fasteners 341 and flight shims 349 provide for predictable surface to surface contact between heat pipe 104 and heat exchanger plate 102 in order to maximize heat transfer efficiency and provide an electrical connection to ground. Moreover, as noted herein, flight fasteners 341 and the thickness of flight shims 349 provide a selected compression force securing heat pipe 104 against a bottom surface of channel 112. In some embodiments, flight fasteners 341 may be a shoulder bolt to ensure proper engagement to threaded hole 350. Finally, a gap 453 may be maintained between channel 112 outer channel surface 456 (e.g., an opposing lateral surface of channel 112) and lateral surface 235 to accommodate heat pipe 104 nub 239, and/or other protrusions of heat pipe 104.

Thus, the two thermally bonded heat pipe 104 to heat exchanger plate 102 interfaces (e.g., bottom and lateral sides) described herein provide for an approximate 50% improvement in heat transfer capacity/efficiency from heat exchanger plate 102 to heat pipe 104, as compared to embodiments with single sided thermally bonded interfaces.

Figure 5:
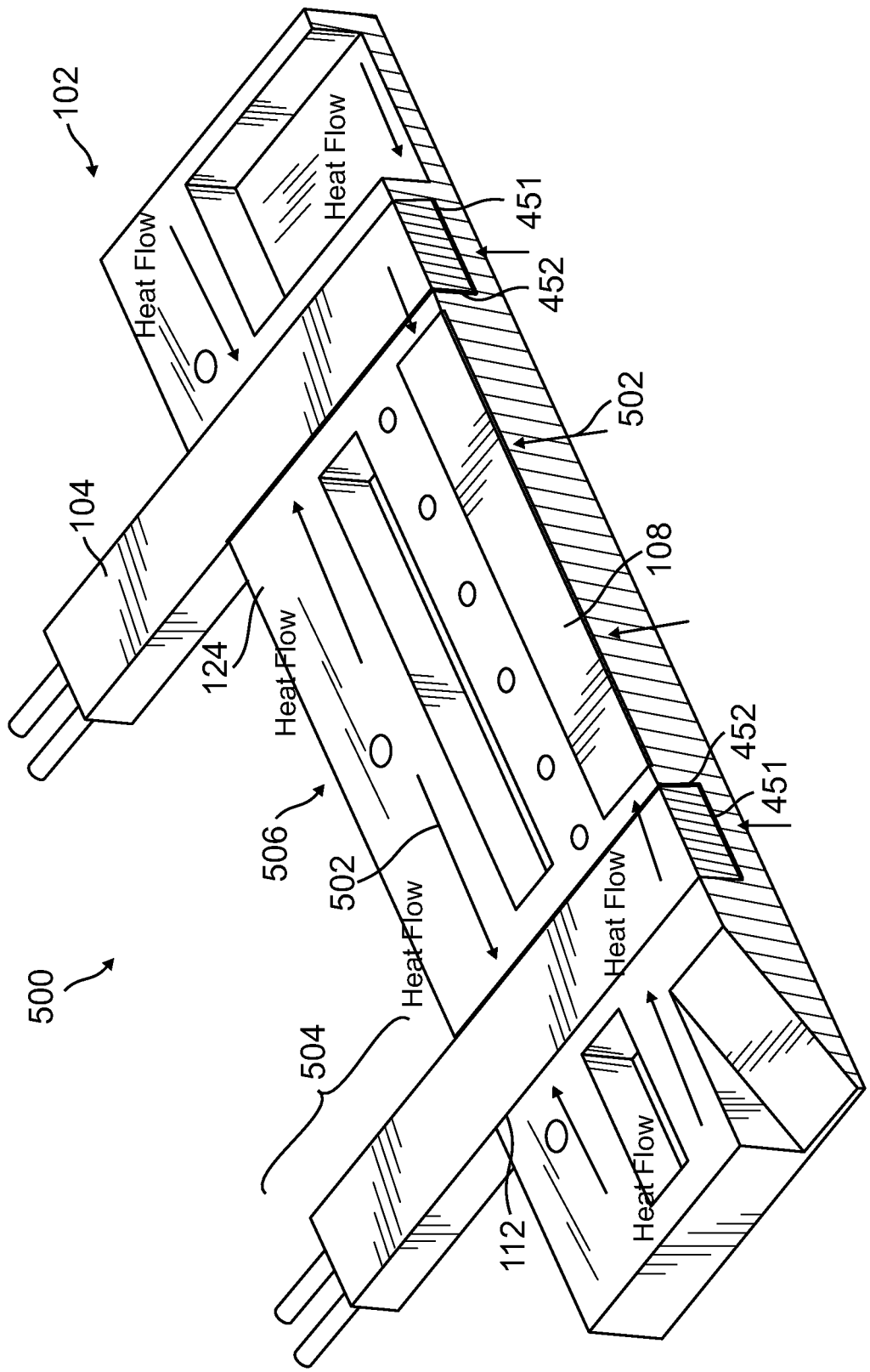
FIG. 5 illustrates a perspective cross-section of a heat exchanger plate in accordance with an embodiment of the disclosure.

FIG. 5 illustrates a perspective cross section of a heat exchanger plate 500 in accordance with an embodiment of the disclosure. In this regard, a flight system application of heat flow (e.g., heat transfer) from a thermal source (e.g., heat generating electrical and/or electronic units) is illustrated. Arrows 502 illustrate heat transfer paths from various locations on heat exchanger plate 102. Heat pipe 104 may include a nipple portion 504 extending through an open end of channel 112 and beyond an external edge 506 of heat exchanger plate 102. Nipple portion 504 may be used to cool and cycle the convection gas and/or fluid to help create a cooling cycle within heat pipe 104.

Heat may flow from the thermal source physically secured to heat exchanger plate 102 top surface 670 (see FIG. 6) through heat exchanger plate 102 as illustrated by arrows 502. Heat flows most effectively from the thermal source through heat exchanger plate 102 to thermal interface material 108 and further to thermal sink 671 (see FIG. 6) in contact with thermal interface material 108, when the thermal source is in vicinity of thermal interface material 108. In this regard, thermal interface material 108 in contact with thermal sink 671 physically secured to heat exchanger plate 102 provides for an efficient heat transfer system.

However, when the thermal source is not in proximity of thermal interface material 108, heat may flow most efficiently from the thermal source through heat exchanger plate 102 and through lateral thermal bond 452 and bottom thermal bond 451 to heat pipe 104. Further, heat may be transported to the vicinity of thermal interface material 108 through heat pipe 104. In this regard, a heat exchanger plate 102 with two thermally bonded interfaces (e.g., lateral thermal bond 452 and bottom thermal bond 451) provides for a significant increase in heat transfer capacity over single surface embodiments as the contact surface is significantly increased.

FIG. 6 illustrates an assembly 600 including a heat exchanger plate 102 with heat pipes 104 that is physically secured to a flight system panel 680 in accordance with an embodiment of the disclosure. FIG. 7 illustrates an assembly 700 including connection joints between thermal sink 671 and a system panel (e.g., flight system panel 680 of FIG. 6) and between mechanical supports 674/675 and the system panel, in accordance with an embodiment of the disclosure. One or more mechanical supports 674, 675 and 676 may be secured to flight system panel 680 using one or more washers 787 and/or fasteners 786. A plurality of radio frequency (RF) washers 785 may be placed between mechanical supports 674, 675, and 676 and flight system panel 680 prior to securing mechanical supports 674, 675 and 676 to flight systems panel 680. RF washers 785 may be configured to provide local ground paths and/or clearance with respect to embedded inserts in flight system panel 680. RF washers 785 may be held in place by fasteners 795.

Regarding attachment of thermal sink 671 to flight system panel 680, a grafoil pad 783 (e.g., and/or any other type of thermal interface material, similar to thermal interface material 108) may be positionally placed on a panel shim 784 and tack bonded to panel shim 784 to hold grafoil pad 783 in place. Panel shim 784 may be configured to control compression and prevent damage to grafoil pad 783 when thermal sink 671 is secured to flight system panel 680. Panel shim 784 with grafoil pad 783 facing flight system panel 680 may be positioned or placed between a lower flange 792 and flight system panel 680. Lower flange 792 may be physically secured to flight system panel 680 using a plurality of fasteners 794. In alternative embodiments, grafoil pad 783 and/or panel shim 784 may be replaced with thermally insulating materials in order to help thermally isolate heat within heat exchanger plate 102 from flight system panel 680.

Regarding attachment of heat exchanger plate 102 to thermal sink 671, thermal interface material 108 (see FIG. 1) may be positioned or placed within recess 110 (see FIG. 1) and may be tack bonded to hold thermal interface material 108 in place. Thermal sink 671 may be positioned or placed on plate surface 124 (see FIG. 1) of heat exchanger plate 102 by alignment of an upper flange 793 of thermal sink 671 to a plurality of hollow countersunk through holes 677 on top surface 670 of heat exchanger plate 102. Through holes 677 are countersunk to allow for a flat surface on which thermal sources can be physically secured. A plurality of fasteners 781 may be placed in countersunk through holes 677 from top surface 670 and turned into threaded inserts/nut plates 782 of thermal sink 671. Fasteners 781 may be tightened to engage thermal sink 671 to thermal interface material 108. Recess 110 (FIG. 1) includes a depth configured to select a compression force for thermal interface material 108 while heat exchanger plate 102 is coupled to thermal sink 671. In various embodiments, thermal interface material 108 may be compressed to approximately 50 to 60 percent of its uncompressed thickness when fasteners 781 are fully tightened. In this regard, thermal sink 671 contacting thermal interface material 108 and physically secured to heat exchange plate 102 provides for efficient heat transfer from heat exchanger plate 102 to thermal sink 671. FIG. 6 illustrates thermal sink 671 extending beyond heat exchanger plate 102 in order to be able to couple to a radiator and/or other thermal conduits.

As shown, heat exchanger plate 102 may be secured to mechanical supports 674, 675 and 676. Heat exchanger plate 102 may include a plurality of hollow countersunk through holes 678 formed through heat exchanger plate 102. Countersunk through holes 678 may be configured to receive a plurality of washers 787 and fasteners 786 to physically secure heat exchanger plate to one or more mechanical supports 674, 675 and 676, which thereby secure heat exchanger plate 102 to flight system panel 680. Through holes 678 are countersunk to allow for a flat surface on which thermal sources can be physically secured. A plurality of washers 787 and fasteners 786 may be placed in countersunk through holes 678 from top surface 670 and secured into threaded holes or inserts in mechanical supports 674, 675 and 676.

One or more ground straps 679 may be secured to a side 681 of heat exchanger plate 102 using one or more washers 789 and fasteners 788. Ground straps 679 may be further physically secured to flight system panel 680 through a threaded insert 791 using one or more washers 790 (e.g., which may be RF washers) and fasteners 788.

One or more thermal sinks 671 may be physically secured to a radiator (not shown) at thermal sink 671 shaped flange 672 locations by placing fasteners 788 in one or more shaped flange 672 through holes 673 and tightening fasteners 788 to physically secure thermal sink 671 to the radiator.

In various embodiments, a plurality of washers and fasteners (e.g., similar to washers 787 and fasteners 786) may be used to physically secure thermal source 699 to top surface 670 of heat exchanger plate 102 at various threaded and/or through hole locations (e.g., similar to through hole locations 677).

Figure 8:
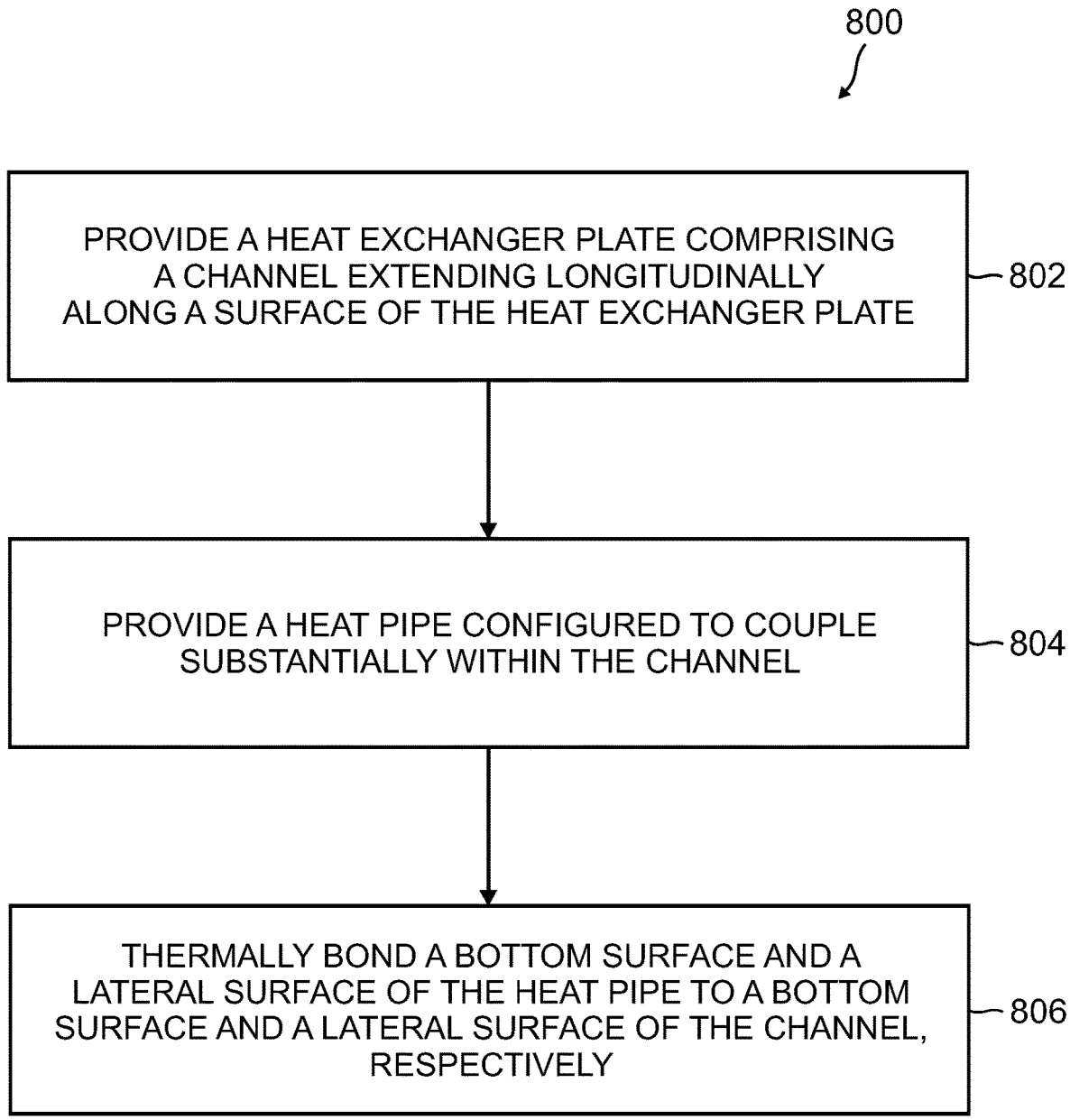
FIG. 8 illustrates a flow diagram describing a process for providing a heat exchanger system in accordance with an embodiment of the disclosure.

FIG. 8 illustrates a flow diagram describing a method 800 for providing a heat exchanger system in accordance with an embodiment of the disclosure. The blocks shown in method 800 are not necessarily exhaustive.

Method 800 may begin in block 802 by providing a heat exchanger plate comprising a channel extending longitudinally along a surface of heat exchanger plate. For example, heat exchanger plate 102 may be machined from bulk aluminum to include a first channel 112 and a first heat pipe 104. Channel 112 may extend longitudinally along plate surface 124 of heat exchanger plate 102. First heat pipe 104 may be coupled substantially within first channel 112. In some embodiments, heat exchanger plate 102 may include a second channel 112 and a second heat pipe 104. Second channel 112 may be formed extending longitudinally along plate surface 124 of heat exchanger plate 102, where second channel 112 may be parallel to and spaced from first channel 112. Second heat pipe 104 may also be coupled substantially within second channel 112.

In some embodiments, heat exchanger plate 102 may include a plurality of threaded holes 347 formed within a lateral surface 352 of heat exchanger plate 102 that extends to an opposing lateral surface of channel 112. Threaded holes 347 may be configured to receive a plurality washers 348 and compression screws 346 to thread into threaded holes 347 to provide a lateral compression force against heat pipe 104 during thermal bonding. Lateral compression force may be used to help thermally bond a finished lateral surface 236 of heat pipe 104 to an inner channel surface 455 of channel 112.

The method 800 may continue in block 804 by providing a heat pipe configured to couple substantially within the channel. For example, heat pipe 104 may be formed by extruding material to form an extruded heat pipe stock 204. In some embodiments, heat pipe stock 204 may be formed from aluminum, however, other materials may be possible. Extruded heat pipe stock 204 may be sectioned into a length approximately corresponding to the length of heat exchanger plate 102. A bottom and a lateral surface of heat pipe 104 may be substantially planar and orthogonal and may be finished to facilitate thermal bonding.

In some embodiments, heat pipe 104 may be formed to include two pipe cavities 232 disposed longitudinally along heat pipe 104.

Each pipe cavity 232 may be sealed flush at a first end of sectioned heat pipe stock 204 and coupled to a heat pipe fill tube 106 at a second end. Each pipe cavity 232 and/or finished bottom and lateral surfaces (e.g., finished bottom surface 237 and finished lateral surface 236) of heat pipe 104 may be configured to sealably contain a convection gas and/or fluid at an approximate temperature range from −40 to 130 degrees Celsius, a maximum expected operating pressure of approximately 750 pounds per square inch absolute (psia), and an external pressure substantially at vacuum. In some embodiments, the convection gas and/or fluid may include anhydrous ammonia (e.g., anhydrous ammonia with a purity of 99.999 percent or greater, for example), another convection gas and/or fluid, or a combination of convection gasses and/or fluids. Each pipe cavity 232 of heat pipe 104 may be filled through a corresponding heat pipe fill tube 106. After filling a pipe cavity 232 with a selected amount of convection gas/fluid (e.g., selected to provide convection at the expected temperature range), fill tube 106 may be pinched off and/or soldered to form a leak-proof seal. Heat pipe 104 may also include a nipple portion 504 extending through an open end of channel 112 and beyond an external edge 506 of heat exchanger plate 102. In some embodiments, prior to adding convection gas and/or fluid, each pipe cavity 232 may be roughened, coated, plated, and/or otherwise treated to facilitate thermal transfer between the convection gas and/or fluid and heat pipe 104 and/or to prevent corrosion of the pipe cavity 232.

After a heat exchanger plate 102 and a heat pipe 104 are provided, method 800 may continue in block 806 by thermally bonding a bottom surface and a lateral surface of heat pipe 104 to a bottom surface and a lateral surface of the channel 112, respectively. In some embodiments, two heat pipes 104 may be thermally bonded wherein a bottom surface and a lateral surface of second heat pipe 104 may be thermally bonded to a bottom surface and a lateral surface of a second channel 112, respectively. Additional heat pipes are contemplated. Block 806 may start by placing a bottom thermal bonding material (e.g., bottom thermal bond 451) between bottom surface of heat pipe 104 and bottom surface of channel 112 and a lateral thermal bonding material (e.g., lateral thermal bond 452) between lateral surface of heat pipe 104 and lateral surface of channel 112. In some embodiments, the thermal bonding material may be implemented as a thin film adhesive.

Heat pipe 104 may be placed into channel 112. A vertical compression force may be applied substantially across the bottom surfaces and a lateral compression force may be applied substantially across the lateral surfaces. The vertical compression force may be applied to help thermally bond finished bottom surface 237 of heat pipe 104 to bottom channel surface 454 of channel 112. In this regard, a vertical compression force may be applied through one or more vertical clamps and/or one or more clamp shims and/or static applied weights configured to press a top surface 233 of heat pipe 104 toward a top surface 670 of heat exchanger plate 102. Tightening one or more vertical clamps provides a vertical compression force substantially across finished bottom surface 237 of heat pipe 104 and bottom channel surface 454 of channel 112.

Lateral compression force may be applied to help thermally bond finished lateral surface 236 of heat pipe 104 to inner channel surface 455 of channel 112. A lateral compression force may be applied by inserting at least one lateral shim 345 between an opposing lateral surface of heat pipe 104 and one or more of threaded holes 347. Threading a compression screw 346 into threaded hole 347 provides a lateral compression force through at least one lateral shim 345 to heat pipe 104. In some embodiments, two or more sets of compression screws 346 may be provided along a lateral side 126 of heat exchanger plate 102.

After securing a bottom surface and a lateral surface of heat pipe 104 to a bottom surface and a lateral surface of channel 112, block 806 may continue by thermally cycling heat exchanger plate 102, heat pipe 104, and thermal bonding material (e.g., bottom thermal bond 451 and lateral thermal bond 452) to thermally bond the bottom surfaces (e.g., finished bottom surface 237 of heat pipe 104 to bottom channel surface 454 of channel 112) and thermally bond the lateral surfaces (e.g., finished lateral surface 236 of heat pipe 104 and inner channel surface 455 of channel 112). In some embodiments, the temperature environment may be dynamic, where heat exchanger plate 102 and thermal bond material (e.g., bottom thermal bond 451 and lateral thermal bond 452) slew through a plurality of temperatures as heat exchanger plate 102 and thermal bond material cycle between a lower and an upper target temperatures until the bond material cures. In other embodiments, the temperature environment may be substantially static, where heat exchanger plate 102 and thermal bond material may be held at a constant temperature for a period of time until the bond material cures.

In various embodiments, vertical and/or lateral compression forces may be implemented to allow for slight movement of heat pipe surfaces relative to heat exchanger plate surfaces as bottom thermal bond 451 and lateral thermal bond 452 (e.g., thin film materials and/or adhesives) soften and/or liquefy during thermal cycling. For example, during thermal cycling and/or curing of the thermal bonding materials, finished bottom surface 237 of heat pipe 104 may move slightly closer to bottom channel surface 454 of channel 112 and finished lateral surface 236 of heat pipe 104 may move closer to inner channel surface 455 of channel 112.

After heat pipes 104 are thermally bonded to heat exchanger plate 102, flight shims 349 and flight fastening hardware (e.g., washer 343 and flight fastener 341) may be provided to physically secure heat pipes 104 to heat exchanger plate 102, for example, and to provide an electrical connection to ground (e.g., a direct current (DC) electrical connection to ground). In this regard, one or more shaped flanges 344 formed as part of heat pipe 104 may be configured to physically secure heat pipe 104 to heat exchanger plate 102. Additionally, one or more flight shim recesses 351 may be formed within heat exchanger plate 102 adjacent to channel 112 substantially beneath shaped flanges 344. Flight shim recesses 351 may be configured to receive flight shims 349.

Physically securing heat pipes 104 to heat exchanger plate 102 may include inserting each flight shim 349 within a corresponding flight shim recess 351 and securing shaped flanges 344 to heat exchanger plate 102, wherein each flight shim 349 includes a thickness configured to select a compression force securing heat pipe 104 against the bottom channel surface 454 of channel 112 while shaped flanges 344 are secured to heat exchanger plate 102. A plurality of threaded holes 350 may be formed in heat exchanger plate 102 corresponding to shaped flange 344 through hole 342 locations. Each of threaded holes 350 may be configured to receive a washer 343 and a flight fastener 341 to physically secure heat pipe 104 to heat exchanger plate 102.

Heat exchanger plate 102 may be physically secured to a thermal sink 671 to transfer heat away from heat exchanger plate 102. In this regard, heat exchanger plate 102 may be formed (e.g., in block 802) to include a recess 110 formed adjacent to channel 112 in plate surface 124 of heat exchanger plate 102 that may be configured to receive a thermal interface material 108 adapted to thermally couple heat exchanger plate 102 to thermal sink 671. Recess 110 may include a depth configured to select a compression force for thermal interface material 108 while heat exchanger plate 102 is coupled to thermal sink 671. Thermal interface material 108 may be placed into recess 110 and thermal sink 671 may be physically secured to heat exchanger plate 102 at recess 110. Thermal sink 671 may be in physical contact with thermal interface material 108 when thermal sink 671 is secured to heat exchanger plate 102. One or more fasteners 781 may be provided to secure thermal sink 671 to heat exchanger plate 102.

Subsequent to block 806, heat exchanger plate 102 may be physically secured to a flight system panel 680. In this regard, the method may include physically securing one or more mechanical supports 674, 675 and 676 to a flight system panel 680 and thermal sink 671 to the flight system panel 680 adjacent to each of the mechanical supports and physically securing plate surface 124 of heat exchanger plate 102 to mechanical supports 674, 675 and 676 and thermal sink 671.

One or more mechanical supports 674, 675 and 676 may be secured to flight system panel 680 using one or more washers 787 and fasteners 786. A plurality of RF washers 785 may be placed between mechanical supports 674, 675 and 676 and flight system panel 680 prior to securing mechanical supports to flight system panel 680.

Preparing thermal sink 671 for attachment to flight system panel 680 may include placing a grafoil pad 783 onto a panel shim 784. Panel shim 784 prevents damage to grafoil pad 783 and controls compression during attachment of thermal sink 671 to flight system panel 680. Panel shim 784 with grafoil pad 783 facing flight system panel 680 may be placed between a lower flange 792 and flight system panel 680. Thermal sink 671 may be physically secured to flight system panel 680 at thermal sink 671 lower flange 792 interface to flight system panel 680. Thermal sink 671 lower flange 792 may be physically secured to flight system panel 680 using a plurality of fasteners 794.

Heat exchanger plate 102 may be secured to mechanical supports 674, 675 and 676 using one or more washers 787 and fasteners 786. Heat exchanger plate 102 may be positioned or located to the mechanical supports by alignment of countersunk hollow through holes 678 to mechanical supports 674, 675 and 676. One or more washers 787 and fasteners 786 may be placed in through holes 678 and tightened into mechanical supports 674, 675 and 676 from top surface 670. Through hole 678 diameter is formed larger than the outer diameter of washer 787 to recess fasteners 786 flush with top surface 670 of heat exchanger plate 102 to provide a flat surface for securing a thermal source to top surface 670. Heat exchanger plate 102 may be physically secured to thermal sink 671 as discussed herein.

In some embodiments, one or more ground straps 679 may be physically secured to heat exchanger plate 102 side surface 681 using one or more washers 789 and fasteners 788. One or more ground straps 679 may be physically secured to flight system panel 680 and threaded insert 791 using one or more washers 790 and fasteners 788. Ground strap 679 may be a metallic electrically conducting material to ensure an electrical connection (e.g., a DC electrical connection) between flight system panel 680 and heat exchanger plate 102. Two ground straps 679 may be provided for redundancy to ensure at least one electrical connection exists throughout the operational lifetime of the arrangement.

In general use, a thermal source (e.g., thermal source 699) may be physically secured to top surface 670 of heat exchanger plate 102, wherein heat from the thermal source may be transferred through heat exchanger plate 102 and/or heat pipe 104 to thermal sink 671. In some embodiments, one or more blind pockets 122 may be formed (e.g., as part of block 802) in plate surface 124 of heat exchanger plate 102 to reduce a weight of heat exchanger plate 102.

Figure 9:
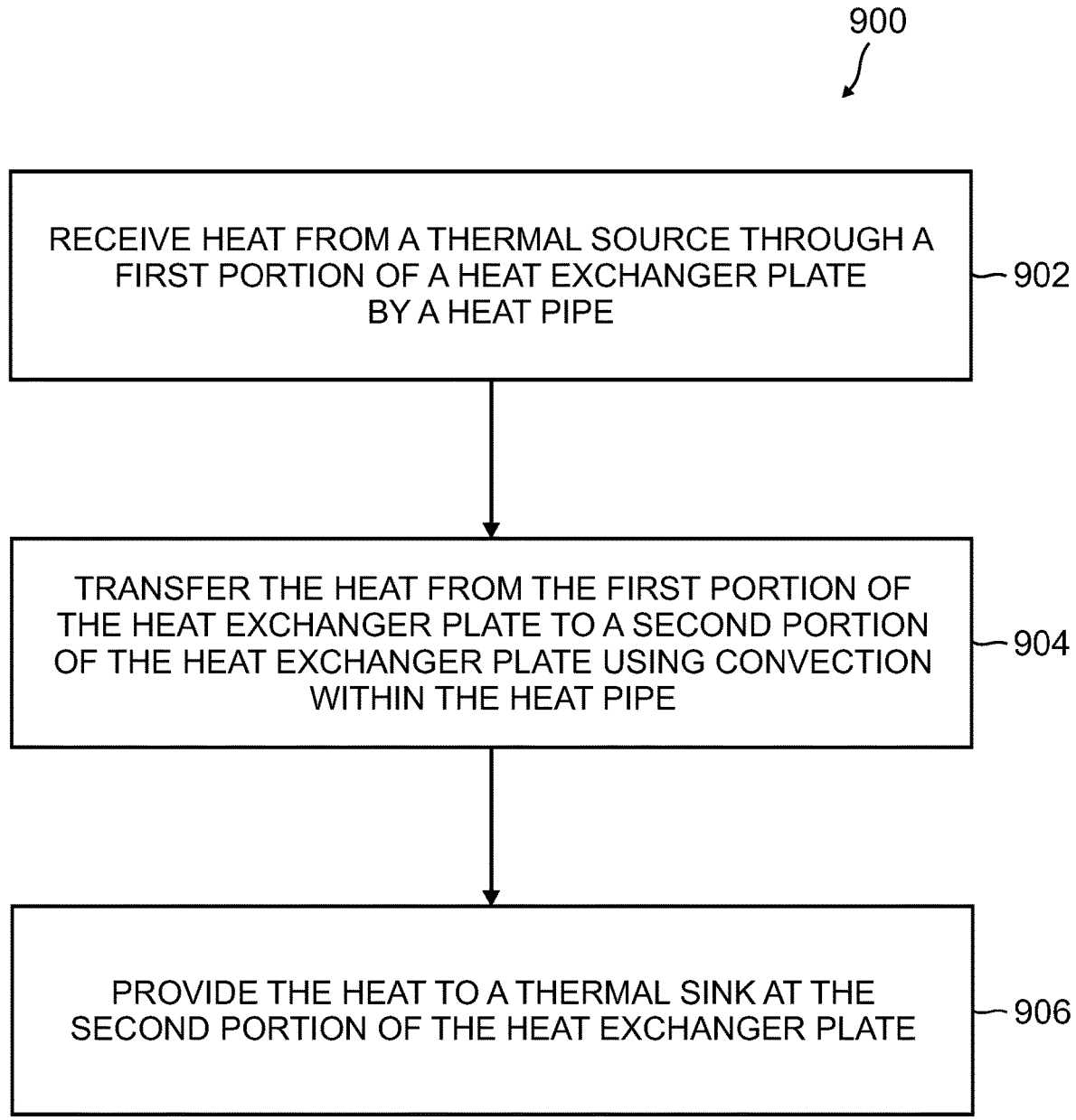
FIG. 9 illustrates a flow diagram describing a method for using a heat exchanger system in accordance with an embodiment of the disclosure.

FIG. 9 illustrates a flow diagram describing a method 900 for using a heat exchanger system in accordance with an embodiment of the disclosure. The blocks or steps shown in method 900 are not exhaustive and may include other steps and/or additional iterations of the blocks to implement thermal transfer in a heat exchanger system, as described herein.

Prior to beginning method 900, a heat exchanger plate 102 may be provided. In this regard, heat exchanger plate 102 includes a channel 112 extending longitudinally along a surface 124 of heat exchanger plate 102 and a heat pipe 104 coupled substantially within channel 112. A bottom surface 237 and a lateral surface 236 of heat pipe 104 may be thermally bonded to a bottom surface 454 and a lateral surface 455 of channel 112, respectively. Heat exchanger plate 102 may be physically secured to a flight system panel 680. Further, heat exchanger plate 102 may be physically secured to a thermal sink 671 to transfer heat away from heat exchanger plate 102 and/or heat pipes 104.

Method 900 may begin in block 902 by receiving heat from a thermal source 699 through a first portion of heat exchanger plate 102 by a heat pipe 104. For example, thermal source 699 (e.g., heat generating electrical and electronic units or devices) may be physically secured to an opposing side (e.g., opposing side 670 shown in FIG. 6) of heat exchanger plate 102. Thermal source 699 may generate heat that may be transferred through a first portion of heat exchanger plate 102 (e.g., a portion of heat exchanger plate in contact with thermal source 699 and leading to one or more heat pipes 104, shown in FIGS. 5 and 6 as heat flow 502 traversing towards one or both heat pipes 104). For example, heat may be transferred from thermal source 699 through heat exchanger plate 102 and through lateral thermal bond 452 and bottom thermal bond 451 to heat pipe 104.

After receiving heat from a thermal source 699 through a first portion of heat exchanger plate 102 by a heat pipe 104, block 904 may continue process 900 by transferring the heat from the first portion of the heat exchanger plate 102 to a second portion of the heat exchanger plate 102 (e.g., shown in FIGS. 5 and 6 as the portion of heat exchanger plate 102 adjacent thermal interface material 108 and/or thermal sink 671) using convection within the heat pipe 104. In this regard, thermally bonding bottom surface 237 and lateral surface 236 of heat pipe 104 to bottom surface 454 and lateral surface 455 of channel 112 provides for an efficient heat transfer path from heat exchanger plate 102 first portion to heat pipe 104.

Heat pipe 104 may be formed to include two pipe cavities 232 disposed longitudinally along heat pipe 104. Pipe cavities 232 may be filled with a convention gas and/or fluid as described herein. Convection transfer of heat from first portion of heat exchanger plate 102 to a second portion of heat exchanger plate 102 may occur most efficiently within pipe cavities 232, due to mass transfer by convention of the convection gas and/or fluid. In this regard, heat may be transported to the vicinity of thermal interface material 108 and/or thermal sink 671 through heat pipe 104 (e.g., thermal interface material 108 being adjacent the second portion of heat exchanger plate 102).

After transferring the heat from the first portion of the heat exchanger plate 102 to a second portion of the heat exchanger plate 102 using convection within the heat pipe 104, block 906 may continue process 900 by providing the heat to thermal sink 671 at or adjacent the second portion of the heat exchanger plate 102 (e.g., shown in FIGS. 5 and 6 as the portion or portions of heat exchanger plate 102 adjacent thermal interface material 108 and/or thermal sink 671). Thermal interface material 108 (e.g., at the second portion of heat exchanger plate 102) may be adapted to thermally couple heat exchanger plate 102 to thermal sink 671. In this regard, thermal interface material 108 may be positioned within a recess 110, and thermal sink 671 may be secured to heat exchanger plate 102 at recess 110 to provide compression contact with thermal interface material 108.

Heat is transferred through bottom surface 237 and lateral surface 236 of heat pipe 104 to bottom surface 454 and lateral surface 455 of channel 112 in proximity to thermal interface material 108. Thermal interface material 108 provides for an efficient heat transfer path from heat exchanger plate 102 to thermal sink 671. In some embodiments, thermal sink 671 may be physically secured to a radiator to facilitate heat transfer away from the system and/or to the environment.

Embodiments described above illustrate but do not limit the invention. For example, it will be appreciated that, where appropriate, principles applied herein to heat exchanger plates used in flight system panels can be applied to heat exchanger plates used in other system panels. It should also be understood that numerous modifications and variations are possible in accordance with the principles of the present invention. Accordingly, the scope of the invention is defined only by the following claims.

What is claimed is:

1. An apparatus comprising:
a heat exchanger plate comprising a channel extending longitudinally along a surface of the heat exchanger plate; and
a heat pipe configured to sealably contain a convection gas and/or fluid at an approximate temperature range from 1K to 300K within a vacuum environment, the heat pipe being coupled substantially within the channel, wherein a bottom surface and an inner lateral surface of the heat pipe are thermally bonded to a bottom surface and an inner lateral surface of the channel, respectively, the heat pipe extending substantially along a full length of the heat exchanger plate within the channel, wherein an outer lateral surface of the heat pipe is not bonded to an outer lateral surface of the channel, wherein the outer lateral surface of the heat pipe is separated from the outer lateral surface of the channel by a gap disposed between the outer lateral surface of the heat pipe and the outer lateral surface of the channel across from a thermal bond formed between the inner lateral surface of the heat pipe and the inner lateral surface of the channel, the gap extending along the full length of the heat exchanger plate within the channel;
wherein a plurality of threaded holes are formed in a lateral surface of the heat exchanger plate, the threaded holes extending to the outer lateral surface of the channel, and wherein the threaded holes are configured to allow compression screws to provide a lateral compression force to the heat pipe to help form the thermal bond between the inner lateral surface of the heat pipe and the inner lateral surface of the channel.

2. The apparatus of claim 1, wherein:
the bottom and lateral surfaces of the heat pipe are substantially planar and orthogonal to each other; and
the heat pipe comprises a nipple portion extending through an open end of the channel and beyond an external edge of the heat exchanger plate.

3. The apparatus of claim 1, wherein:
the channel comprises a first channel and the heat pipe comprises a first heat pipe;
the heat exchanger plate comprises a second channel extending longitudinally along the surface of the heat exchanger plate, wherein the second channel is substantially parallel to and spaced from the first channel; and
the apparatus comprises a second heat pipe coupled substantially within the second channel;
wherein a bottom surface and an inner lateral surface of the second heat pipe are thermally bonded to a bottom surface and an inner lateral surface of the second channel, respectively, and wherein an inner lateral surface of the first channel and the inner lateral surface of the second channel are closer to each other than an outer lateral surface of the first channel and an outer lateral surface of the second channel.

4. The apparatus of claim 1, wherein:
the heat pipe is formed from extruded heat pipe stock;
the heat pipe comprises a plurality of separate pipe cavities disposed longitudinally within the heat pipe;
each pipe cavity is sealed flush with a first end of the heat pipe and is coupled to a heat pipe fill tube at a second end of the heat pipe;

each pipe cavity is configured to sealably contain a convection gas and/or fluid at an approximate temperature range from 1K to 300K within a vacuum environment.

5. The apparatus of claim 1, further comprising:
at least one lateral shim disposed between the outer lateral surface of the heat pipe and one or more of the plurality of threaded holes;
wherein the threaded holes are configured to allow compression screws to provide a lateral compression force through the at least one lateral shim to the heat pipe to help form the thermal bond between the inner lateral surface of the heat pipe to the inner lateral surface of the channel.

6. The apparatus of claim 1, wherein the bottom and inner lateral surfaces of the heat pipe are thermally bonded to the bottom and inner lateral surfaces of the channel by:
placing a thermal bonding material between the bottom surface of the heat pipe and the bottom surface of the channel and between the inner lateral surface of the heat pipe and the inner lateral surface of the channel;
applying a vertical compression force substantially across the bottom surfaces and a lateral compression force substantially across the inner lateral surfaces; and
thermally cycling the apparatus and the thermal bonding material to thermally bond the bottom surfaces to each other and the inner lateral surfaces to each other.

7. The apparatus of claim 1, further comprising one or more flight shims, wherein:
the heat pipe comprises one or more shaped flanges configured to physically secure the heat pipe to the heat exchanger plate after the heat pipe is thermally bonded to the heat exchanger plate;
the heat exchanger plate comprises one or more flight shim recesses adjacent to the channel substantially beneath the shaped flanges and configured to receive the flight shims; and
each flight shim is disposed within a corresponding recess and comprises a thickness configured to select a compression force securing the heat pipe against the bottom surface of the channel while the shaped flanges are secured to the heat exchanger plate.

8. The apparatus of claim 1, wherein:
the heat exchanger plate comprises a recess formed adjacent to the channel in the surface of the heat exchanger plate,
the recess is configured to receive a thermal interface material configured to thermally couple the heat exchanger plate to a thermal sink; and
the recess comprises a depth configured to select a compression force for the thermal interface material to compress the thermal interface material to at most 60 percent of an uncompressed thickness of the thermal interface material while the heat exchanger plate is coupled to the thermal sink.

9. The apparatus of claim 1, wherein:
the heat exchanger plate and/or the heat pipe comprise aluminum;
the heat exchanger plate comprises one or more blind pockets formed in the surface of the heat exchanger plate that are configured to reduce a weight of the heat exchanger plate; and
the heat exchanger plate comprises an inclined slot disposed in a side of the surface of the heat exchanger plate that is configured to provide sufficient clearance to allow an elongate thermal sink coupled to the surface of the heat exchanger plate to curve away from and extend perpendicularly through the surface of the heat exchanger plate.

10. The apparatus of claim 1, further comprising one or more mechanical supports configured to physically secure the heat exchanger plate to a system panel, wherein:
the heat exchanger plate comprises a plurality of holes formed perpendicularly through the heat exchanger plate; and
the plurality of holes are configured to receive fasteners configured to physically secure a thermal sink and the one or more mechanical supports to the surface of the heat exchanger plate and to physically secure a thermal source to an opposing surface of the heat exchanger plate.

11. A method comprising:
receiving heat at a first portion of a heat exchanger plate;
transferring the heat from the first portion of the heat exchanger plate to one or more thermal sinks physically secured to a first surface of the heat exchanger plate, wherein the heat flows from the first portion of the heat exchanger plate to the one or more thermal sinks most efficiently through one or more heat flow paths passing through a thermal interface material placed in one or more recesses in the first surface of the heat exchanger plate, wherein the thermal interface material in the one or more recesses is under a compression force applied by the one or more thermal sinks;
wherein the heat exchanger plate comprises one or more channels extending along the first surface of the heat exchanger plate, the one or more channels being associated with one or more heat pipes operable to transfer heat by convection, wherein the one or more heat pipes are thermally bonded to one or more inner surfaces of the one or more channels, the one or more heat pipes extending along the one or more channels;
wherein in the one or more heat flow paths, the heat flows through the heat exchanger plate to the one or more heat pipes, then along the one or more heat pipes to a vicinity of the thermal interface material, then to the thermal interface material, then to the one or more thermal sinks.

12. The method of claim 11, wherein:
bottom and lateral surfaces of at least one heat pipe are substantially planar and orthogonal to each other and are bonded respectively to a bottom surface of an associated channel of the one or more channels and the associated channel's lateral surface adjacent to at least one recess of the one or more recesses; and
the at least one heat pipe comprises a nipple portion extending through an open end of the associated channel and beyond an external edge of the heat exchanger plate.

13. The method of claim 11, wherein the one or more channels comprise at least two channels parallel to each other.

14. The method of claim 11, wherein the one or more thermal sinks are physically secured to at least one radiator.

15. The method of claim 11, wherein:
at least one heat pipe of the one or more heat pipes comprises one or more shaped flanges configured to physically secure the at least one heat pipe to the heat exchanger plate after the at least one heat pipe is thermally bonded to the heat exchanger plate;
the heat exchanger plate comprises one or more flight shim recesses adjacent to an associated channel of the one or more channels substantially beneath the one or more shaped flanges and configured to receive corresponding one or more flight shims; and at least one flight shim of the one or more flight shims is disposed within a corresponding flight shim recess of the one or more flight shim recesses and comprises a thickness configured to select a compression force securing the at least one heat pipe against the bottom surface of the associated channel while the one or more shaped flanges are secured to the heat exchanger plate.

16. The method of claim 11, wherein:

the heat exchanger plate and/or at least one heat pipe of the one or more heat pipes comprise aluminum;

the heat exchanger plate comprises one or more blind pockets formed in the surface of the heat exchanger plate that are configured to reduce a weight of the heat exchanger plate; and the heat exchanger plate comprises an inclined slot disposed in a side of the surface of the heat exchanger plate that is configured to provide sufficient clearance to allow an elongate thermal sink coupled to the surface of the heat exchanger plate to curve away from and extend perpendicularly through the surface of the heat exchanger plate.

17. The method of claim 11, further comprising:

physically securing a mechanical support to a flight system panel and the one or more thermal sinks to the flight system panel adjacent to the mechanical support;

physically securing the surface of the heat exchanger plate to the mechanical support and the one or more thermal sinks; and physically securing a thermal source providing the heat to an opposing surface of the heat exchanger plate.

18. The method of claim 11, further comprising receiving heat at a second portion of the heat exchanger plate, wherein the heat flows from the second portion of the heat exchanger plate to the one or more thermal sinks most efficiently through the thermal interface material without passing through any heat pipe.

19. A heat exchanger assembly comprising:

a heat exchanger plate comprising a first surface having one or more recesses for containing thermal interface material, the first surface having one or more channels;

one or more heat pipes bonded to one or more inner surfaces of the one or more channels;

one or more thermal sinks physically securable to the first surface of the heat exchanger plate to apply a compression force to the thermal interface material and enable heat to flow from at least one portion of the heat exchanger plate to the one or more thermal sinks most efficiently by flowing to at least one heat pipe of the one or more heat pipes, then along the at least one heat pipe towards at least one recess of the one or more recesses, then to the thermal interface material in the at least one recess, then to at least one thermal sink of the one or more thermal sinks.

20. The assembly of claim 19, wherein the one or more recesses are spaced from the one or more heat pipes.

* * * * *